(12) United States Patent
Mehta et al.

(10) Patent No.: US 6,300,451 B1
(45) Date of Patent: *Oct. 9, 2001

(54) LONG-CHAIN BRANCHED POLYMERS AND THEIR PRODUCTION

(75) Inventors: Aspy Keki Mehta, Humble; Charles Stan Speed, Dayton; Jo Ann Marie Canich, Webster, all of TX (US); Norbert Baron, Cologne (DE); Bernard Jean Folie, Rhodes-St-Genese (BE); Makoto Sugawara; Akihira Watanabe, both of Yokkaichi (JP); Howard Curtis Welborn, Jr., deceased, late of Houston, TX (US), by John L. Zipprich, II, executer

(73) Assignee: Exxon Chemical Patents Inc., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/328,187

(22) Filed: Oct. 24, 1994

(Under 37 CFR 1.47)

(51) Int. Cl.[7] ........................ C08F 236/20; C08F 236/06
(52) U.S. Cl. ........................ 526/339; 526/127; 526/160; 526/170; 526/281; 526/282; 526/283; 526/308; 526/335; 526/336
(58) Field of Search ................... 526/336, 339, 526/282, 170, 160, 283

(56) References Cited

U.S. PATENT DOCUMENTS

| | | |
|---|---|---|
| 3,472,829 | 10/1969 | Claybaugh et al. . |
| 3,624,056 * | 11/1971 | Minchak ............... 526/339 X |
| 3,645,992 | 2/1972 | Elston . |
| 3,658,770 * | 4/1972 | Longi et al. ........... 526/336 X |
| 3,821,143 | 6/1974 | Cluff et al. . |
| 3,984,610 | 10/1976 | Elston . |
| 4,404,344 | 9/1983 | Sinn et al. . |
| 4,668,834 | 5/1987 | Rim et al. . |
| 4,882,406 | 11/1989 | Cozewith et al. . |
| 5,064,802 | 11/1991 | Stevens et al. . |
| 5,084,534 * | 1/1992 | Welborn, Jr. et al. ... 526/339 X |
| 5,096,743 | 3/1992 | Schoenbeck . |
| 5,191,052 * | 3/1993 | Welborn, Jr. ........... 526/339 |
| 5,218,071 | 6/1993 | Tsutsui et al. . |
| 5,229,478 | 7/1993 | Floyd et al. . |
| 5,272,236 | 12/1993 | Lai et al. . |
| 5,278,272 | 1/1994 | Lai et al. . |
| 5,324,800 | 6/1994 | Welborn, Jr. et al. . |
| 5,364,916 | 11/1994 | Renkema et al. ........ 526/161 |
| 5,374,695 | 12/1994 | Tanaglia et al. ........ 526/125 |
| 5,410,003 * | 4/1995 | Bai ..................... 526/336 X |
| 5,552,489 * | 9/1996 | Merrill et al. ......... 526/160 X |
| 5,703,187 | 12/1997 | Timmers . |

FOREIGN PATENT DOCUMENTS

| | | |
|---|---|---|
| 946997 | 5/1974 | (CA) . |
| 3240362 | 5/1984 | (DE) . |
| 035 242 B | 9/1981 | (EP) . |
| 273 654 B | 7/1988 | (EP) . |
| 273 655 A2 | 7/1988 | (EP) . |
| 275 676 A1 | 7/1988 | (EP) . |
| 0347129 | 12/1989 | (EP) . |
| 0 446 013 A2 | 9/1991 | (EP) . |
| 0552946 | 7/1993 | (EP) . |
| 2244276A | 11/1991 | (GB) . |
| A-54010/1998 | 3/1989 | (JP) . |
| 3-70727/1991 | 3/1991 | (JP) . |
| WO 85/04664 | 10/1985 | (WO) . |
| 8703610 | 6/1987 | (WO) . |
| 9214766 | 9/1992 | (WO) . |
| 9308221 | 4/1993 | (WO) . |
| 9325591 | 12/1993 | (WO) . |
| WO 94/00500 | 1/1994 | (WO) . |
| WO 94/07930 | 4/1994 | (WO) . |
| WO 94/13715 | 6/1994 | (WO) . |

OTHER PUBLICATIONS

Baldwin and VerSrate, "Polyolefin Elastomers Based On Ethylene and Propylene," *Rubber Chemistry & Technology*, vol. 45, No. 3 (Apr. 30, 1972).

(List continued on next page.)

Primary Examiner—Fred Teskin

(57) ABSTRACT

Copolymers, and processes to make them, are provided which are derived from monomers comprising:
  a) one mono-olefin having a single Ziegler-Natta polymerizable bond;
  b) a second monomer having at least one Ziegler-Natta polymerizable bond;
  c) a third monomer having at least two Ziegler-Natta polymerizable bonds such monomer being:
    i) straight-chained and of less than six or at least seven carbon atoms;
    ii) other than straight chained; or
    iii) combinations thereof,
such copolymer having:
  c) at least about one carbon-carbon unsaturated bond per number average molecule;
  d) viscous energy of activation (Ea) at least 1 kcal/mol greater than a copolymer having a linear backbone derived from same monomers, but excluding species having at least two Ziegler-Natta polymerizable bonds;
  e) crystallinity level of about 10% to about 50%; and
  f) $M_z/M_w$ at least about 1.7.

Such copolymers show enhanced melt processability and other attributes during end-product fabrication.

27 Claims, 5 Drawing Sheets

OTHER PUBLICATIONS

Beasley, "The Molecular Structure of Polyethylene. IV. Kinetic Calculation of the Effect of Branching on Molecular Weight Distribution," *J. Am. Chem. Soc.* vol. 75, pp. 6123–6127 (1953).

Hogan, *Applied Industrial Catalysis*, vol. 1, Academic Press (1983).

Hogan et al., "Melt Elasticity in Linear PE Containing Long Branches,"*SPE Journal*, vol. 23, No. 11, Nov. 1967, pp. 87–95.

Kaminsky et al., "Stereoselective Polymerization of Olefins with Homogenous, Chiral Ziegler–Natta Catalysts," *Die Angew. Makromol. Chem.* vol. 145/146, pp. 149–160 (1986).

Kaminsky et al., "Isotatic Polymerization of Olefins with Homogeneous Zirconium Catalysts," *Transition Metals and Organometallics as Catalysts for Olefin Polymerization*, pp. 291–301, Springer–Verlag (1988).

Randall et al., "High Resolution Solution Carbon $^{13}$NMR Measurements of Irradiated Polyethylene," *Radiation Physics Chemistry* vol. 22, No. 1/2, pp. 183–192 (1983).

Randall et al., "A $^{13}$C NMR Study of Radiation–Induced Structural Changes in Polyethylene," *NMR and Macromolecules, Am.Chem.Soc.*, pp. 245–267 (1984).

21st Penn State Polymer Symposium (Oct. 13, 1993).

Opposition to European Patent 0788521B1 by Dupont Dow Elastomers, dated Sep. 23, 1999.

Opposition to European Patent 0788521 by Mitsui Chemicals Inc., dated Sep. 23, 1999.

"Terpolymers for Ethylene, Propene and 1,5–Hexadiene Synthesized with Zirconocene/Methyl–aluminoxane", presented in Makromolecular Chemistry, Rapid Communications at 11, 89–94 (1990).

"Ethylene Propylene Diene Terpolymers Produced with a Homogeneous and Highly Active Zirconium Catalyst", Journal of Polymer Science: Polymer Chemistry Edition, vol. 23, 2151–2164.

* cited by examiner

LONG-CHAIN BRANCHED POLYMERS AND THEIR PRODUCTION

FIELD OF THE INVENTION

This invention relates to thermoplastic polymers, including polyolefins, having enhanced processability and controlled levels of branching, as well as methods for their production. These polymers are derived from at least three monomers: one monomer is a mono-olefin having a single Ziegler-Natta (Z-N) polymerizable bond; a second monomer having one or more Z-N polymerizable bonds; and a third monomer having at least two Z-N polymerizable bonds including straight-chained olefins of less than six or at least seven carbon atoms or cyclic olefins.

BACKGROUND OF THE INVENTION

Polyolefins are versatile materials which are generally easily processed and useful in numerous applications. Historically, processors of polyolefins have needed to accept some undesirable properties along with their ease of processability. Such undesirable characteristics include high fractions of low molecular weight species leading to smoking during fabrication operations, high levels of extractable materials and the possibility of leaching of these low weight molecules out of the formed polymer articles or packaging. Over the years, polymers other than traditional low density polyethylene (LDPE) including materials such as linear low density polyethylene (LLDPE) and high density polyethylene (HDPE) have been developed. While offering several beneficial properties, they have been accompanied by some of their own limitations including difficulty in processing, melt fracture tendencies and low melt strength.

The advent of single-site catalysis (SSC), particularly metallocene-type catalysis has offered the possibility of producing entirely new polymers with remarkably narrow molecular weight distributions (MWDs) or polydispersities. This means that some of the problems associated with the presence of very low molecular weight polymer species are virtually eliminated with polymers produced by these catalysts. Enhancements to the melt processability of these narrow MWD linear materials would add to the value of the materials for many end use applications. One of the methods which can enhance melt processability is the inclusion of long chain branching. We have found that the controlled inclusion of long branches (differentiated from short chain branches which result from the copolymerization of olefin comonomers) on an otherwise essentially linear backbone, produces significant changes in key Theological parameters, leading to enhanced melt processability. We have accomplished this in a manner which includes the ability to control overall polymer crystallinity and crystallization tendencies while offering additional points of accessible residual unsaturation. These may be left unaltered in the polymer resin, reduced by hydrogenation, functionalized, or utilized in post-formation curing to yield a material behaving much like a thermosetting polymer but having the benefit of processing like a traditional thermoplastic polyolefin.

In the art of polyolefin manufacturing, it is recognized that copolymerization of olefins (comonomers) in the polymer backbone will alter the crystallinity and therefore the density of the material by interfering with the ability of the polymer molecules to "pack." While such "short-chain branches" are effective in disrupting the crystal structure, thereby reducing density, they generally have little effect on the melt rheology of the polymers. For the purposes of describing this invention, we will discuss polymer molecular structure changes which are Theologically significant. Generally, this will include long-chain branching, or branches from the main polymer backbone which are longer than branches obtained by copolymerization of easily obtained, commercially available olefin monomers. Such rheologically significant branching will be noted in the behavior of the molten polymer: an enhancement of polymer melt strength, a reduced tendency for melt fracture, and an increase in viscous or flow energy of activation, $E_a$. These Theological properties of the molten polymer are generally easily quantified and will provide a convenient method to distinguish polymers of this invention relative to the prior art. By contrast, attempts to directly quantify polymer long chain branches (e.g. by spectroscopic techniques) have a very limited range of applicability due to inherent limitations in the techniques.

These long-chain branches will generally enhance the melt-processability of polymers. This effect is particularly pronounced for polymers having narrow MWD, including those which are produced by single-site, specifically metallocene, catalysis. Such polymers having long-chain branching will generally have melt-flow properties enhanced for many applications (e.g., those applications benefiting from higher melt strength) than will like polymers without the long-chain branching.

The following publications address issues related to those outlined above; however, none have arrived at the same solution and offer the unique combination of properties of the present invention. The prior work is nonetheless significant, as discussed below.

DE 3240382 (Hoechst) refers to the use of small amounts of diolefins, including norbornadiene (see page 8) to control "verzweigung" (branching), density and elasticity.

EP 35242-B (BASF) discloses copolymerization of ethylene and alpha-omega ($\alpha,\omega$) diolefins to provide cross linked products.

EP 273654; EP 273655 and EP 275676 (Exxon) disclose copolymerization of dienes. Page 9, lines 33 to 37 of EP 275676 discusses the nature of incorporation.

U.S. Pat. No. 3,984,610 to Elston describes partially crystalline polymers of ethylene and $\alpha,\omega$-dienes or cyclic endomethylenic dienes containing at least one norbornene nucleus. The polymer apparently has long-chain branches derived from polymerization via the second unsaturation of the diene. This disclosure focuses on polymers with "low residual unsaturation." The limit is described, at page 3, line 33, as less than one carbon-carbon double bond per 1000 carbon atoms. Actually, the demonstration provided in columns 7 and 8 appears to show the greatest unsaturation to be 0.7 carbon-carbon double bond per 1000 carbon atoms, thus manifesting the apparent intent of the work being to provide truly low levels of residual unsaturation. By contrast, the polymers of the present invention generally have substantially higher levels of residual unsaturation, as illustrated in the Examples. This higher level of residual unsaturation provides enhanced opportunities for functionalizing or post-formation curing of molded/extruded articles, thereby providing a novel balance of melt processability and end-use properties.

U.S. Pat. No. 4,404,344 (EP 035 242) to Sinn describes the copolymerization of ethylene and alpha olefins or α,ω-dienes. Their description does not appear to contemplate the benefits of copolymerization of multiple mono-olefins with polyenes.

U.S. Pat. No. 4,668,834 (EP 223,394) to Rim, et al. describes low molecular weight copolymers of ethylene and an alpha olefin having three to twelve carbons. The polymer exhibits vinylidene (chain-end) unsaturation. These liquid polymers are useful in curable electrical potting compounds.

Kaminsky and Drogemuller described, in "Terpolymers of Ethylene, Propene and 1,5-Hexadiene Synthesized with Zirconocene/Methyl-aluminoxane," presented in *Makromolecular Chemistry, Rapid Communications* at 11, 89–94 (1990), the terpolymerization of 1,5-hexadiene with other olefins. The occurrence of long-chain branching was inferred by the authors. Not mentioned in this reference is our finding of the high propensity of 1,5-hexadiene to cyclize to a 5 membered cyclopentane-type ring structure, following 1,2 insertion into the chain. This feature makes 1,5-hexadiene a generally unattractive choice to initiate long chain branching, the bulky cyclic structures complicating chain flexibility and crystallizability. Diene moieties shorter or longer than 1,5 hexadiene are less prone to cyclize and consequently more attractive, as is shown later in the Examples.

Hoel describes, in U.S. Pat. No. 5,229,478 (EP 0 347 129), a process for producing elastomers of ethylene, propylene, and a diene with at least one internal double bond. In this manner, a readily processable rubber is easily made, such material being capable of curing after formation through cross-linking of the internal double bond. This description does not contemplate either dienes with two Z-N accessible double bonds or the benefits of using other alpha olefins for modification of crystallization and density.

U.S. Pat. No. 3,472,829 discloses an ethylene propylene norbornadiene terpolymer.

Canadian Patent 946,997 discloses an ethylene-propylene 1,4-hexadiene-1,7 octadiene tetrapolymer.

Japanese Patent B-70727/1991 discloses an ethylene-propylene 1,7 octadiene terpolymer obtained using a $MgCl_2$/$TiCl_4$—Al(i $C_4H_9$)$_3$ catalyst. Additional disclosures include tetrapolymers formed from ethylene, propylene, 5-ethylidene-2-norbornene and 1,7-octadiene or 1,9-decadiene.

Incorporation of comonomers with ethylene has been known and practiced for years. Yano et al. describe, in EP 0446 013, a polyethylene, and its process for production, which has numerous regular methyl branches, or is copolymerized with propylene, along its backbone. This does not appear to provide any material rheological benefits.

Lai et al. provide a method of obtaining long-chain branching in U.S. Pat. No. 5,272,236 and U.S. Pat. No. 5,278,272 (WO 93/08221). These publications describe a system in which low monomer and high polymer concentrations are maintained to encourage what is described as long-chain branching. The quantification of the levels of long chain branching is via spectroscopic techniques and the long chain branching is reportedly independent of molecular weight distribution. There is no indication that the resulting polymers have enhanced levels of residual unsaturation.

SUMMARY OF THE INVENTION

Polymerization of species having more than one Z-N polymerizable bond, particularly diolefins, especially cyclic dienes or linear backbone α,ω-dienes, with other suitable monomers, particularly alpha-olefins, provides a controllable and efficient means for introducing long-chain branching into the polymer backbone. One of the Z-N polymerizable bonds is incorporated into the growing polymer chain during polymerization. The other Z-N polymerizable bond remains accessible for later incorporation in another growing polymer chain to form a long branch. A means of producing such polymers is provided by this invention.

The use of species having at least one Z-N polymerizable bond, particularly mono-olefins, as primary polymerization entities in this invention affords the ability to control overall polymer crystallinity and crystallization tendency, separate from the incorporation of long branches. This permits the production of products with enhanced melt processability over a range of crystallinities. For example, ethylene-based polymer will make possible a crystallinity range of from just under 10% to upwards of 50%.

A beneficial aspect of this invention is the ability to produce a polymeric material having measurable and controllable residual unsaturation. Practice of this invention provides polymers having preferably at least one unsaturated carbon-carbon bond per 1000 carbon atoms. This unsaturated bond provides numerous options which are useful to the end user. The unsaturation may be retained as-is, or utilized, for example, in a functionalization reaction where additional desirable chemical moieties are incorporated, or utilized in the crosslinking of formed articles to yield a product with thermoset-type end properties but melt processable via standard thermoplastic polyolefin-based techniques.

DETAILED DESCRIPTION OF THE INVENTION

Figure 1:
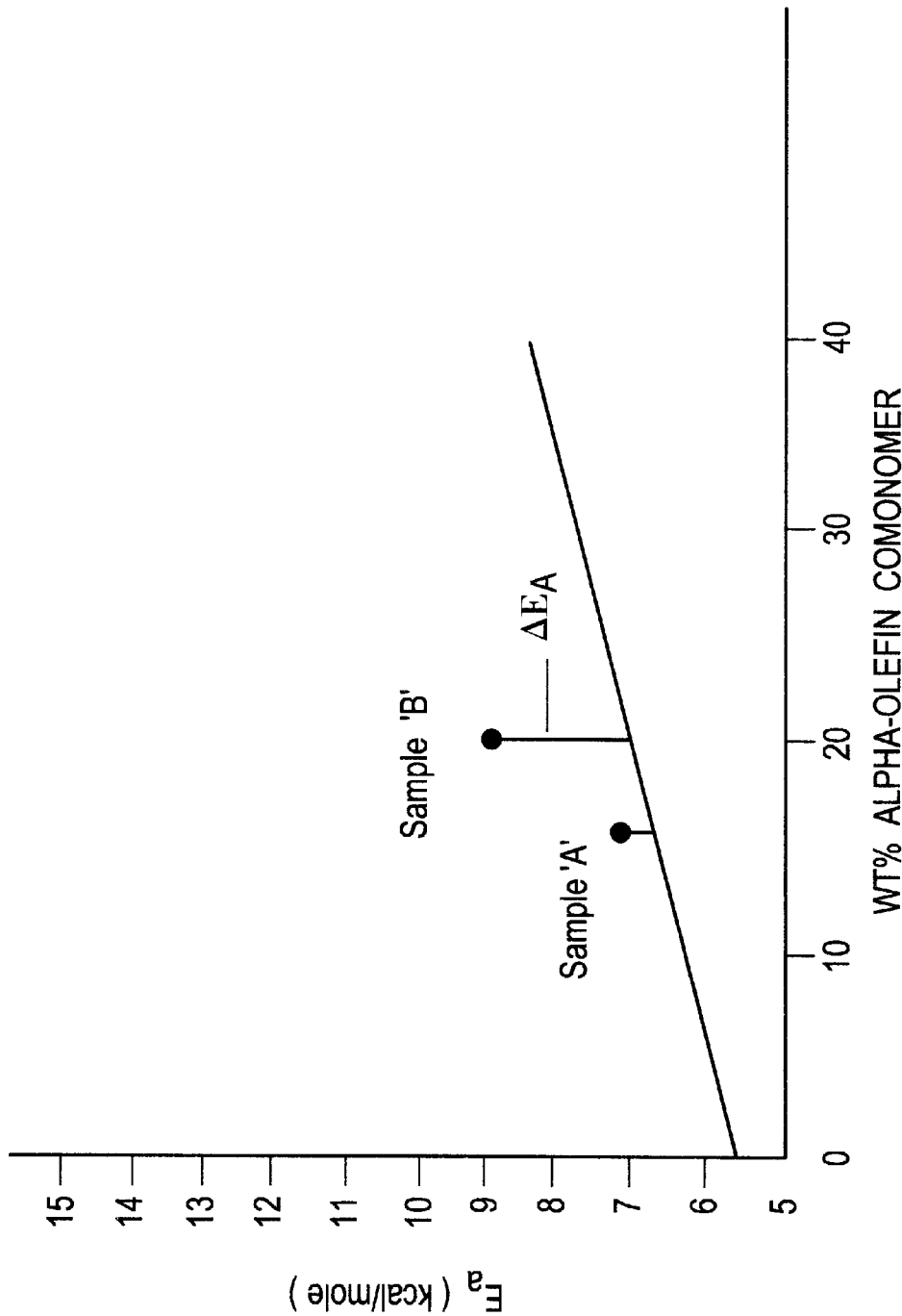
FIG. 1 illustrates the method used to determine the presence of long chain branching from a plot of the viscous or flow activation energy $E_a$ versus α-olefin comonomer content.

The polymers of this invention are copolymers of three or more species having Z-N polymerizable bonds, preferably olefins. Polymerization may be accomplished using Z-N catalysts, particularly single-site catalysts (SSC), preferably metallocene-type catalysts. Metallocenes impart benefits such as narrow composition distribution, substantially random (i.e., non-blocky) comonomer insertion along the polymer backbone as well as generally easier comonomer incorporation. Processes for producing these polymers are another aspect of this invention.

In one aspect of the invention, the polymers can be described as copolymers derived from the following monomers:
a) at least one monomer having a single Z-N polymerizable bond,
b) a second monomer having at least one Z-N polymerizable bond, and
c) a third monomer having at least two Z-N polymerizable bonds, such monomer being:
 i) straight-chained of less than six or at least seven carbon atoms, or
 ii) other than straight-chained
such copolymer preferably having:
d) at least about one carbon-carbon unsaturated bond per number average molecule;
e) viscous energy of activation ($E_a$) at least 1 kcal/mol greater than a copolymer having a linear backbone derived from the same monomers, but excluding species having at least two Z-N polymerizable double bonds;
f) crystallinity level from about 10% to about 50%;
g) $M_z/M_w$ at least about 1.7 (for a Flory-type molecular weight distribution obtained typically with a single site catalyst—e.g. metallocene-based—the $M_z/M_w$ is approximately 1.5);
h) $M_w/M_n$ at least about 2.2 (for a Flory-type molecular weight distribution, obtained typically with a single site catalyst—e.g. metallocene-based—the $M_w/M_n$ is approximately 2.0).

From another viewpoint the inventive polymers can be described as copolymers derived from monomers comprising:
a) at least one monomer having a single Z-N polymerizable bond,
b) a second monomer having at least one Z-N polymerizable bond, and
c) a third monomer having at least two Z-N polymerizable bonds, such monomer being:
 i) straight-chained of less than six or at least seven carbon atoms or
 ii) other than straight-chained
such copolymer having:
d) $M_z/M_w$ greater than about 1.7 (for a Flory-type molecular weight distribution obtained typically with a single site catalyst—e.g. metallocene-based—the $M_z/M_w$ is approximately 1.5);
e) greater than one unsaturated carbon-carbon bond per number average molecule.
f) viscous energy of activation ($E_a$) more than 1 kcal/mol greater than a copolymer having a linear backbone, derived from same monomers, but excluding species having at least two Z-N polymerizable double bonds; and
g) crystallinity level from 10% to 40%.

The making of these copolymers is also an important facet of our invention. Various methods for polymer production are useful, most of which can be described as the process for copolymerizing:
a) at least one monomer having a single Z-N polymerizable bond,
b) a second monomer having at least one Z-N polymerizable bond, and
c) a third monomer having at least two Z-N polymerizable bonds, such monomer being:
 i) straight-chained and of less than six or at least seven carbon atoms or
 ii) other than straight-chained
such process comprising the steps of:
d) contacting monomers with Z-N catalyst, derivative, or combinations thereof at time, temperature, and pressure sufficient to effect polymerization; and
e) recovering copolymer.

One such process which is particularly useful involves conducting the contacting step at a pressure in excess of about 100 bar, preferably in excess of 500 bar, and at a temperature greater than about 60° C., preferably greater than about 100° C. Such a process may be employed in high pressure equipment including autoclaves and tubular reactors.

Another process comprises polymerizing ethylene and a polyene having at least two Ziegler polymerizable double bonds at a temperature of at least 120° C. using a catalyst derived from a transition metal compound having a bulky ancillary ligand to make an ethylene copolymer having an MIR of at least 25 and an activation energy of at least 9.0 Kcal per mol.

Of course, variations upon each of these previously described aspects will become apparent to those skilled in the art upon recognition of the basic invention and its useful nature. The previous descriptions are intended as a guide for those familiar with the art and are not intended to be limiting.

The majority component (the "at least one monomer" in the above description) of the polymers of this invention will typically be ethylene. It will typically represent about 75–98 mol %, more preferably 78–96 mol % and most preferably 80–93 mol % of the polymer.

The second monomer can be any monomer having at least one Z-N polymerizable bond. It will typically be a readily available mono-olefin such as: propylene, butene-1, pentene-1, hexene-1, heptene-1, octene-1, nonene-1, decene-1, undecene-1, dodecene-1, hexadecene-1, octadecene-1, and 4-methylpentene-1. Though simple linear olefins are preferred in light of their easy availability, many other species are also useful as the basic building blocks of these polymers. These will include useful cyclic or substituted olefins including those which may be multiply (internally) unsaturated. The second monomer will typically represent about 2–25 mol %, more preferably 4–22 mol %, most preferably 7–20 mol % of the polymer. Those skilled in the art will recognize that the specific monomer selected, and the degree of its incorporation will control crystallinity, density and other properties of the polymer.

For the purpose of describing the materials and methods of this invention, species having at least two Z-N polymerizable bonds will include those which are straight-chained species of less than six or at least seven carbon atoms as well as cyclic and branched species. A general description follows.

Species Having at Least Two Z-N Polymerizable Bonds

Such species can be cyclic or non-cyclic including, of course, those which are straight chained or branched. For cyclics, the "Z-N polymerizable bonds" would include:

i) internal unsaturations between two secondary carbons (these being defined as carbons bonded to two other carbons), ii) terminal unsaturations derived from $C_1$–$C_{20}$ hydrocarbyl substituents on the cyclic group, and iii) combinations thereof.

In these cases the base cyclic group may be fully saturated (type ii), partially saturated (type i or iii), or aromatic (type ii).

Examples of cyclics with "at least two Z-N polymerizable bonds" include:

- having type i) unsaturations:

Norbornadiene

- having types i) and ii) unsaturations:

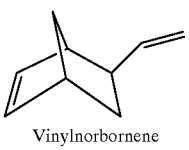

Vinylnorbornene

- having type ii) unsaturations:

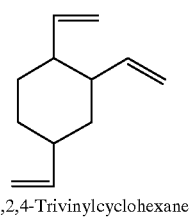

1,2,4-Trivinylcyclohexane

Non-cyclics would include $C_1$–$C_{20}$, linear, or branched, hydrocarbyl moieties containing $\alpha$ and $\omega$ unsaturations, where the $\beta$ and $\psi$ (penultimate) carbons are secondary.

Examples of non-cyclics with "at least two Z-N polymerizable bonds" include:

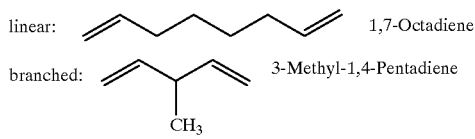

Generally, trienes are included in the list of "species having at least two Z-N polymerizable bonds," however, those which are conjugated, and conjugated dienes, with the exception of 1,3-butadiene, are in many instances not preferred.

Polyenes are favored as "species having at least two Z-N polymerizable bonds". Polyenes, in this instance, include monomer species having at least two double bonds accessible by Z-N catalysts. These will particularly include dienes. Examples of these will include the linear alpha-omega dienes such as: 1,6-heptadiene, 1,7-octadiene, 1,8-nonadiene, 1,9-decadiene, 1,10-undecadiene, 1,11-dodecadiene. Useful cyclic dienes would include various alkylated versions, isomers and combinations thereof for example: cyclohexadiene, cyclooctadiene, cyclodecatriene, vinylcyclohexene, trivinylcyclohexane, hexahydroanthracene, polyvinyl benzene, divinylcyclobutane, dicyclopentadiene and others. Particularly useful cyclic species include those with a norbornene-type structure, particularly norbornadiene, and vinyl norbornene.

Linear species of six carbon atoms are less desirable to use in the practice of this invention, and are preferably avoided, in that they offer some undesirable characteristics when applied to this invention. Kaminsky and Drogmuller demonstrated the use of 1,5-hexadiene in polymerization with ethylene and propylene. Their results, by which they inferred the presence of long-chain branching are consistent with results we found. Further analysis of our product demonstrates, in addition to the long-chain branching, a great deal of cyclization of the hexadiene with the formation of a cyclopentane structure in the polymer backbone. The presence of these cyclic structures reduces chain flexibility (increases $T_g$, the glass transition temperature) and crystallizability. The six carbon straight-chain diolefin appears to provide the greatest likelihood of backbone incorporation as a cyclized species. Less than six or at least seven carbon straight-chained dienes provide good incorporation, the desired levels of residual unsaturation, and minimal cyclization of the diene (or other species having at least two Z-N polymerizable bonds) during polymerization. Thus 1,4-pentadiene (less than six carbons) and 1,9-decadiene (greater than six carbons) polymerize well without the strong cyclization noted with 1,5-hexadiene.

The preferred polymers of this invention will be derived from ethylene and at least one other monomer selected from the group consisting of: butene-1, hexene-1, octene-1, decene-1, dodecene-1, octadecene-1, and 4-methylpentene-1; and at least one species having at least two Ziegler polymerizable bonds selected from the group consisting of: 1,4-pentadiene, 1,6-heptadiene, 1,7-octadiene, 1,8-nonadiene, 1,9-decadiene, 110-undecadiene, 1,11-dodecadiene, or norbornadiene, vinyl norbornene, cyclohexadiene, cyclooctadiene, and cyclodecadiene.

The polymers of this invention will have molecular weights that are compatible with the melt processing needs of the target application (typically, molding or extrusion applications). Preferred polymers, melt processed via standard thermoplastic fabrication techniques, will have molecula weights ($M_w$ by GPC) in the range 20,000 to 120,000.

The polymers of this invention are semi-crystalline and x-ray diffraction based techniques can be used to quantify the level of crystallinity. X-ray diffraction provides one of the fundamental measures of crystallinity in polymers. The method allows a determination of the relative amounts of crystalline and amorphous material in a polymer by resolving the contributions of these two structural entities to the x-ray diffraction pattern, see L. E. Alexander, *X-ray Diffraction Methods in Polymer Science,* 1969, Wiley/Interscience, New York. X-ray crystallinity values for the polymers of this invention range from about 10% to about 50%. Preferred levels of crystallinity are about 10% to about 40%. For ethylene-based polymers, this corresponds to polymer densities in the range from approximately 0.875 g/cm³ to about 0.925 g/cm³. The crystalline nature of the polymers of this invention contributes tensile strength, toughness (impact strength) and abrasion resistance. As a consequence, the polymers of this invention can be utilized in applications where "neat" polymer (i.e. without substantial modifiers or filler) is beneficial, such as clear moldings and extruded profiles for medical applications. In contrast, typical elastomers such as EP and EPDM rubbers, with x-ray crystallinity <7%, generally require the presence of fillers to attain acceptable levels of key physical properties (e.g. tensile strength, abrasion resistance, etc.) as well as acceptable melt processability. Thus for ethylene-based systems, the polymers of this invention are outside the range of typical EP and EPDM elastomers. Depending on the density (or crystallinity level) value, the polymers of this invention could be referred to as plastomers (density range > about 0.875 to about 0.900 g/cm³), very low density (density range > about 0.900 to about 0.915 g/cm³) or low density (density range > about 0.915 to about 0.940 g/cm³) ethylene polymers. By way of reference, U.S. Pat. No. 5,266,392 (Land, et al.) is highlighted. This patent teaches the properties of plastomers and their differentiation from typical elastomers.

The aspect of this invention which includes making the inventive polymers via the use of catalysts and comonomers may be accomplished in any of several ways including any reasonable means of polymerizing olefins such as gas phase, liquid phase, slurry phase, or by high pressure means. The high pressure system is one example of a preferred mode of operation.

Any Z-N catalyst, or combinations of such catalysts, are useful in the polymerization process aspects of this invention. Single-site Z-N catalysts are preferred and among these, metallocene-type, including bis-Cp and those having a single Cp-type ring and a heteroatom are preferred; species having at least two amido or phosphido groups bonded to the transition metal should be functional as well. All of these catalysts may have a bridging group between two of the bulky ligand groups which are bonded to the transition metal atom. These would include the silyl, germyl, and hydrocarbyl bridged bis-Cp, mono-Cp/heteroatom, and bisamido or phosphido species. Of course, such catalysts may be used singly or in combination. The catalysts may be used alone but are preferably combined or reacted with a cocatalyst or activator, with a scavenger, or with combinations of these. The preferred catalysts will be those using metallocene-type systems with alumoxane or a bulky, labile, ionic activator. A suitable scavenger may be added to such a system for further efficiency, this might include, for example an alumoxane. The catalysts, including all or any parts of the catalyst system, of choice may be used alone, dissolved, suspended, supported, as a prepolymerized system, or as combinations of these. If supported, the support will be preferably inert within the polymerization system. Examples of such inert supports include silica, alumina, zirconia, alone or in combination with each other or other inert supports.

Descriptions of the preferred catalysts useful in the practice of this invention may be found in EP A 129 368 which is hereby incorporated by reference, for the purposes of description in the United States, and which describes use of cyclopentadienyl transition metal compounds for catalysis of olefins.

Turner and Hlatky, EP A 277 003, EP A 277 004, and U.S. Pat. No. 5,153,157, which are incorporated by reference for US purposes, describe discrete catalyst systems including metallocene-type chemistry but employing anionic activators. Canich, U.S. Pat. Nos. 5,055,438, 5,096,867, and 5,264,405, incorporated by reference for US. purposes, describes olefin polymerization catalysis using modified metallocene-type catalysts wherein a monocyclopentadienyl/heteroatom transition metal compound is substituted for the earlier generations of metallocene compounds.

Hlatky, Turner, and Canich describe, in WO 92/00333 also incorporated by reference for US purposes, the use of ionic activators with monocyclopentadienyl/heteroatom transition metal compounds for olefin polymerization.

Specific metallocene-type catalysts useful for producing isotactic olefin polymers may be found in EP A 485 820, EP A 485 821, EP A 485 822, and EP A 485 823 by Winter et al, and U.S. Pat. Nos. 5,017,714 and 5,120,867 by Welborn and U.S. Pat. No. 5,026,798 to Canich. These publications are included by reference for US purposes.

Various publications describe placing catalyst systems on a supporting medium and use of the resulting supported catalysts. These include U.S. Pat. Nos. 5,006,500, 4,925,821, 4,937,217, 4,953,397, 5,086,025, 4,913,075, and 4,937,301, by Chang and U.S. Pat. Nos. 4,808,561, 4,897,455, and U.S. Pat. Nos. 5,057,475 to Canich, 5,077,255, 5,124,418, 5,227,440, and 4,701,432, by Welborn, and U.S. application Ser. No. 926,006, and U.S. application Ser. No. 08/155,313, filed Nov. 19, 1993, all of which are here included by reference for U.S. purposes. Further information relating to support techniques and use of the supported catalysts may be found in U.S. Pat. No. 5,240,894 by Burkhardt.

Measurement of composition distribution breadth index (CDBI) or Solubility Distribution Breadth Index (SDBI) provides information relating to the comonomer distribution along the final polymer chain. These are measurement techniques which are well known and used in the industry. CDBI measurements, by Temperature Rising Elution Fractionation (TREF) are now well known in the art and the technique is well described by Wild et al. in the *Journal of Polymer Science, Polymer Physics Edition*, vol. 20, page 441 (1982), U.S. Pat. No. 5,008,204 and WO 93/03093. A means of measuring SDBI may also be found in WO 93/03093.

The direct measurement of long-chain branching (e.g. by spectroscopic techniques) is a complex technique and has a limited range of applicability. One of the reasons is the difficulty, even with a powerful spectroscopic tool such as $^{13}C$ NMR, to effectively and accurately differentiate between side chains of six carbons in length and those longer than six carbons. Also, it is difficult to detect a true long-chain branch when there is background "noise" from numerous short branches, such as those present from copolymerization with typically used α-olefin comonomers such as butene-1, hexene-1, etc.

Long chain branching exerts a strong influence on the melt rheological behavior of a polymer and thus the analysis and quantification of melt rheological behavior represents a unique opportunity to characterize long chain branching. Within the classification of melt rheological methods to characterize long chain branching, the one we have chosen for the purposes of this invention is the viscoelastic energy of activation for flow ($E_a$). It is well known that the viscosity of polymer melts, like that of rheologically simple liquids, decreases with increasing temperature. Various relations defining this temperature dependence have been put forward in the literature, see J. D. Ferry, *Viscoelastic Properties of Polymers*, 3rd edition, 1980, John Wiley and Sons, N.Y. At elevated temperatures ($T>T_g+100°$ C., where $T_g$ is the glass transition temperature), this temperature dependence is best described by an Arrhenius-type expression $$Viscosity(\eta_o)=A\ exp(E_a/RT)$$

or in terms of a reference temperature, $T_{ref}$, $$(\eta_o o)T/(\eta_o)T_{ref}=exp\ [(E_a/R)(1/T-1/T_{ref})]$$

where R is the gas constant. The viscous energy of activation, $E_a$, is relatively easy to measure with good precision, as described by the principle outlined above. It is independent of molecular weight and molecular weight distribution, but is dependent on the branching structure of the polymer.

It is well known that the viscous activation energy for linear polyethylene (HDPE) is about 6 kcal/mol, while that of conventional LDPE is about 12 kcal/mol. It is also well accepted that this difference is due primarily to the presence of long chain branching in the latter material. The value of $E_a$ is also influenced, to a lesser degree, by the presence of short chain branches. Thus, for the purposes of describing this invention, the term $\Delta E_a$ is defined. $\Delta E_a$ reflects a subtraction out of the component attributable to the short chain branch level in the polymer, such that the residual activation energy value reflects a quantitative measure of the long chain branching contribution.

Procedure for Characterization for Long Chain Branching via Rheological Characterization of Viscous Energy of Activation ($E_a$)

Based on the methodology outlined above, an experimental procedure for the assessment of the presence of long chain branching in a sample of olefin polymer and for characterization of the extent of long chain branching, can be accomplished as follows:

Viscosity—temperature dependence is determined by parallel plate oscillatory (sinusoidal) shear measurements using appropriate equipment such as a Rheometrics RMS-800, RDS, or System IV under the following conditions:

Polymer sample: appropriately stabilized prior to testing (e.g., containing approximately 500–1000 ppm of a thermal/oxidative stabilizer—e.g., Irganox 1076 commercially available from Ciba-Geigy)

Frequency range: 0.01–100 rad/sec, preferably with a minimum of five data points per decade.

Temperatures: 150° C., 170° C., 190° C., 220° C.

Maximum strain amplitude: Operator-chosen for best signal (in linear viscoelastic region)—a typical value being 20%.

Data Treatment Includes:

Horizontal superposition of complex modulus, G*, on Log G* v. Log Frequency (ω) curves to 190° C. reference temperature using appropriate software, with emphasis on low frequency superposition.

Fit resultant shift factors to Arrhenius equation for evaluation of $E_a$ from:

$$a_T = \exp(E_a/RT) = \exp[(E_a/R)(1/T - 1/T_{ref})]$$

Display of master curve data and of G' and G", the elastic and viscous moduli, versus frequency (ω).

Data interpretation involves:

Test for long chain branching by comparing measured $E_a$ to that of equivalent linear backbone polymer (i.e. same level of short chain branching, from polymerization of α-olefin comonomer, but no long chain branching). Presence of long chain branching is strongly indicated when the Flow Activation Energy ($E_a$) of the polymer of interest minus the Flow Activation Energy of an equivalent linear polymer is greater than or equal to 1 kcal/mol. The "equivalent linear polymer" has the same level of short chain branching, but is free from any long chain branches. Stated in formula form, long chain branching is indicated when: $\Delta E_a = [(E_a)\text{measured} - (E_a)\text{linear}] \geq 1$ kcal/mol. In FIG. 1, Sample A (without LCB) is compared to Sample B (having LCB). $\Delta E_a$ for Sample A is <1.0, indicating no significant LCB. $\Delta E_a$ for Sample B is well above 1.0, indicating LCB. The curve represents linear ethylene alpha-olefin copolymers. Different α-olefin comonomers would yield different $\Delta E_a$ v. comonomer content relationships.

Compare G' and G" curves (at the different temperatures) for separation/coincidence. This is to provide information on whether high measured $E_a$ values are due to long chain branching only, or due additionally to the formation of a network structure (in which case the GE and G" curves superimpose).

Measurements of molecular weight and molecular weight distribution for the polymers of this invention were done using gel permeation chromatography (GPC) utilizing a Waters Associates (Milford, Mass.) 150 C High Temperature GPC instrument. Measurement was performed at a temperature of 145° C. using trichlorobenzene as solvent at a flow rate of 1.0 cc/min. Santonox R antioxidant commercially available from Monsanto Chemical Co., St. Louis, Mo. was utilized at a level 0.6 g per litre of solvent. Sample size injected into the instrument was 0.30 cc of a 0.1 wt % solution of the polymer dissolved in the solvent. Three mixed bed columns, identified as Shodex AT-80 M/S; available from Showa Denko K.K., Japan, were utilized for the separation. Data collection and analysis was performed using Waters software. The molecular weight calibration curve utilized consisted of three segments, as follows:

1. The low molecular weight end (up to a value of 703) was calibrated against a series of monodisperse n-alkanes ($C_{18}$, $C_{24}$, $C_{36}$, $C_{50}$), the molecular weights of which are known precisely.
2. The central portion (from 1000 to 450,000) was calibrated with narrow molecular weight polystyrene standards, for which the "polyethylene equivalent" molecular weight has been calculated by comparison against SRM 1475, a broad standard linear polyethylene from the National Institute of Standards and Technology (Gaithersburg, Md.). To calculate the "polyethylene equivalent" molecular weights, the peak elution time of each polystyrene standard is compared against the slice report of the polyethylene standard run under identical conditions. A standard slice report listing the molecular weight as a function of cumulative percentage mass eluted for the polyethylene is available from the National Bureau of Standards in NBS Special Publication 260-42 ("The Characterization of Linear Polyethylene SRM 1475").
3. The high molecular weight segment of the curve (>1,000,000) was calibrated against narrow molecular weight distribution polystyrene standards, whose molecular weights have been converted to "polyethylene equivalent" molecular weights using the following Mark-Houwink coefficients,

| Polymer | k | α |
|---|---|---|
| Polystyrene | $1.75 \times 10^{-4}$ | 0.67 |
| Polyethylene | $5.17 \times 10^{-4}$ | 0.70 |

The overall calibration curve is plotted as molecular weight as a unction of elution time, the data points being connected on a point-to-point basis.

To calculate the molecular weight averages of a sample from its chromatogram, a linear baseline is drawn from a region well before the time at which the highest molecular weight molecules elute to the region where linearity is reestablished. The various molecular weight averages were derived from the slice report in the standard manner. No corrections were made in the data treatment to account for the presence of long chain branching in the polymers of this invention.

The expression of the molecular weight in terms of $M_n$ (number average), $M_W$ (weight average) and $M_z$ (z-average) is an accepted practice and is used here for the polymers of this invention. The ratios of the above averages provide measures of the polydispersity or breadth in molecular weight distribution. Thus, for example, linear polymers derived from single site catalysts such as the metallocene-based catalysts, display characteristic Flory-type molecular weight distributions with $M_w/M_n \approx 2.0$ and $M_z/M_w \approx 1.5$. The incorporation of long chain branches via the teachings of this invention disrupts the above characteristic Flory-type distribution of metallocene-based catalysts, resulting in increases of the above ratios depending on the extent of long chain branch incorporation (See FIG. 1). The ratio $M_z/M_w$ is a particularly useful parameter to track the development of the long chain branch-containing species, since it highlights changes at the high molecular weight end of the molecular weight spectrum.

Measurement of unsaturation for the polymers of this invention was done using the standard techniques of $^1$H NMR and FTIR, quantification of the amount of unsaturation being expressed in terms of the number of unsaturation sites per 1000 C atoms. Alternately, this number wag normalized using the number average molecular weight, $M_n$, to express the unsaturation in terms of number of unsaturation sites per number average molecule.

Those skilled in the art will recognize that it is within the scope of this invention to blend the above described polymers with other polymers, fillers and additives to yield a finished product having a desired set of characteristics.

EXAMPLES

Without intent to limit the scope of this invention, a series of experimental polymerizations are presented to assist in illustration of the invention. In all examples, molecular weights were measured using GPC analysis; MIR is the Melt Index Ratio, $I_{21}/I_2$ at 190° C.; $E_a$ is measured by parallel plate oscillatory shear measurement at different temperatures; and unsaturation numbers are per $^1$H NMR or FTIR measurements.

The first two experiments were conducted as liquid-phase polymerizations. A description of the experiments follows. Example 1 describes polymerization of an ethylene/hexene-1 copolymer (control), while Example 2 describes polymerization of a polymer of this invention, an ethylene/hexene-1/1,4-pentadiene copolymer.

Experiment Set A

Polymerization Example 1

This polymerization was performed in a 1-liter autoclave reactor equipped with a paddle stirrer, an external water jacket for temperature control, a regulated supply of dry nitrogen, ethylene, propylene, butene-1 and hexene-1, and a septum inlet for introduction of other solvents or comonomers, transition metal compound and alumoxane solutions. The reactor was dried and degassed thoroughly prior to use. A typical run consisted of injecting 200 ml of toluene, 10 ml hexene-1 and 1.5 ml 10 wt % MAO into the reactor. The reactor was then heated to 80° C. and 0.34 mg of $Me_2Si(Me_4C_5)(N\text{-}c\text{-}C_{12}H_{23})TiCl_2$ (0.25 ml of a 13.4 mg of $Me_2Si(Me_4C_5)(N\text{-}c\text{-}C_{12}H_{23})TiCl_2$ dissolved in 10 ml of toluene solution) was added to the reactor. The reactor was then pressurized to 450 kPa (65 psi) with ethylene, and the reaction was allowed to run for 15 minutes prior to rapidly cooling and venting the system. The solvent was evaporated off the polymer by a stream of nitrogen. An ethylene-hexene-1 copolymer was recovered (17.9 g, $M_w$=248,200, 9.5 mol % hexene-1, $E_a$ calculated=8.54 kcal/mol, $E_a$ observed=9.89 kcal/mol, $\Delta E_a$=1.35 kcal/mol).

Polymerization Example 2

Using the same reactor design and general procedure, 200 ml of toluene, 10 ml hexene-1, 0.05 ml 1,4-pentadiene and 3.0 ml of 10 wt % MAO were added to the reactor. The reactor was heated to 80° C. and 0.67 mg of $Me_2Si(Me_4C_5)(N\text{-}c\text{-}C_{12}H_{23})TiCl_2$ (0.5 ml of a 13.4 mg of $Me_2Si(Me_4C_5)(N\text{-}c\text{-}C_{12}H_{23})TiCl_2$ dissolved in 10 ml of toluene solution) was added to the reactor. The reactor was then pressurized to 450 kPa (65 psi) with ethylene, and the reaction was allowed to run for 15 minutes prior to rapidly cooling and venting the system. After evaporation of the solvent, 24.7 g of an ethylene-hexene-1-1,4-pentadiene copolymer was recovered ($M_w$=162,800, 9.8 mol % hexene-1, $E_a$ calculated=8.59 kcal/mol, $E_a$ observed=12.5 kcal/mol, $\Delta E_a$= 3.91 kcal/mol).

It may be noted that the control, Example 1 without the diene, demonstrates a $\Delta E_a$ of 1.35 kcal/mol while Example 2, with 1,4-pentadiene has a $\Delta E_a$ of 3.91. The control sample itself appears to have the requisite greater than 1 kcal/mol $\Delta E_a$ of this invention. The reason for this may appear, at first glance, to be confusing but is easily understood by reference to Lai et al., in U.S. Pat. No. 5,272,236, who in column 6, lines 35 to 39 indicate that the catalysts of U.S. Pat. No. 5,026,798 are fully functional in the practice of their long-chain branching method. The catalyst used as control in our Example 1, as well as the diene incorporation experiment, is a mono-Cp/heteroatom catalyst as described by U.S. Pat. No. 5,026,798. The conditions used for this experiment are thus similar to the ones described by Lai et al. Therefore, it is reasonable to expect that some oligomerization, followed by incorporation into another growing polymer chain, will occur under these conditions. Such a polymer may follow the description, as stated by Lai et al, of having enhanced processability, via long-chain branching. It is easily seen that Example 2, with incorporation of 1,4-pentadiene, however, demonstrates a substantially greater than 1 kcal/mol $\Delta E_a$ over polymer derived from the same monomers, excluding the species having at least two Z-N polymerizable bonds (in this case the $\alpha,\omega$-diene 1,4 pentadiene) which is characteristic of polymers of this invention.

Experiment Sets I–IV

Several other different copolymerizations incorporating different dienes to promote long-chain branching were run in a pilot-sized high pressure reactor. These included; copolymerization of 1,5-hexadiene with ethylene and butene-1 for comparative purposes; 1,9-decadiene with ethylene and butene-1, and vinyl norbornene with ethylene and hexene-1. These copolymerization reactions were run with single-site catalysts known in the art.

A description of the polymerization experiment follows: A stirred 1500 ml steel autoclave reaction vessel, equipped to perform continuous Z-N polymerization reactions at pressures up to 2500 bar and temperatures up to 300° C., was used. The reaction system was supplied with a thermocouple and pressure transducer to continuously monitor temperature and pressure and also with means to continuously supply purified, compressed monomers (e.g. ethylene, butene-1 and dienes). Equipment for continuously introducing a measured flow of catalyst solution at high pressure and equipment for rapidly venting and quenching the reaction as well as for collecting the polymer product from the reaction environment were in place. The polymerizations were performed without the addition of any external solvent. The reactor contents were stirred continuously, during polymerization, at a rate of 1500 rpm. The temperature in the reactor was established and maintained at the targeted level by pumping in catalyst solution using a continuous high pressure injection pump. Following polymerization, the yield of polymerized product was measured and QC analyses (product melt index and density, at a minimum) were performed. This reaction system involves a once-through polymerization of reactants, with no recycling of unreacted monomers back to the reaction system.

Table I describes the polymerization and reaction conditions for Experimental Sets I to IV. Set I covers the polymerizations of ethylene and butene-1 with 1,5-hexadiene; Set II the polymerization of ethylene and butene-1 with 1,9-decadiene; Set III the polymerizations of ethylene and hexene-1 with vinyl norbornene; Set IV the polymerizations of ethylene and hexene-1 also with vinyl norbornene, but with a different single site catalyst than used in Set III. For Set III (and not sets I, II and IV) gaseous hydrogen was continuously fed to the reactor at 20 liters/hour for MW control.

Table II provides a summary of some product parameters measured on the polymers produced in Experiment Sets I to IV. In each set, the flow activation energy Ea, is observed to increase through the set, with increasing feed levels of the species with 'at least two Z-N polymerizable bonds'. This is indicative of an increase in the level of long chain branching. The first product in each set (that is, the control samples made without any species having 'at least two Z-N polymerizable bonds') shows a measured flow activation energy, $E_a$, comparable to that expected for the incorporated level of alpha olefin comonomer, leading to $\Delta E_a$ (the difference in flow activation energies) values<1 kcal/mol. This is anticipated, since these control samples do not contain any significant long chain branching. Subsequent products in each set show increasing values for $\Delta E_a$ (i.e. >1.0 kcal/mol), indicative of the increasing levels of long chain branching.

Figure 2A:
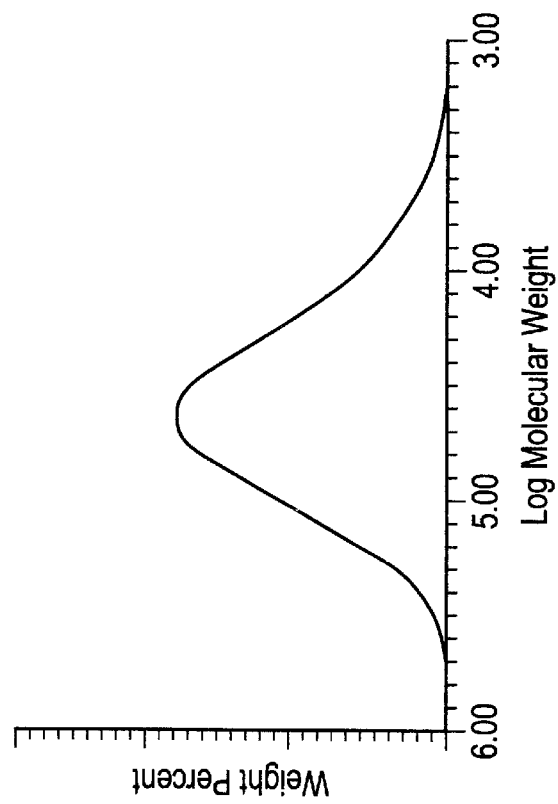
FIG. 2 compares the molecular weight distributions of polymers made without (Product No. 1, a control) and those made with (Product No. 4) species having at least two Z-N polymerizable bonds. The molecular weight distributions referred to in this document are those derived from gel permeation chromatography (GPC). The polymers of this invention made with such species are observed to have a high molecular weight tail, directly attributable to the presence of the long-chain branch containing species.
Figure 2B:
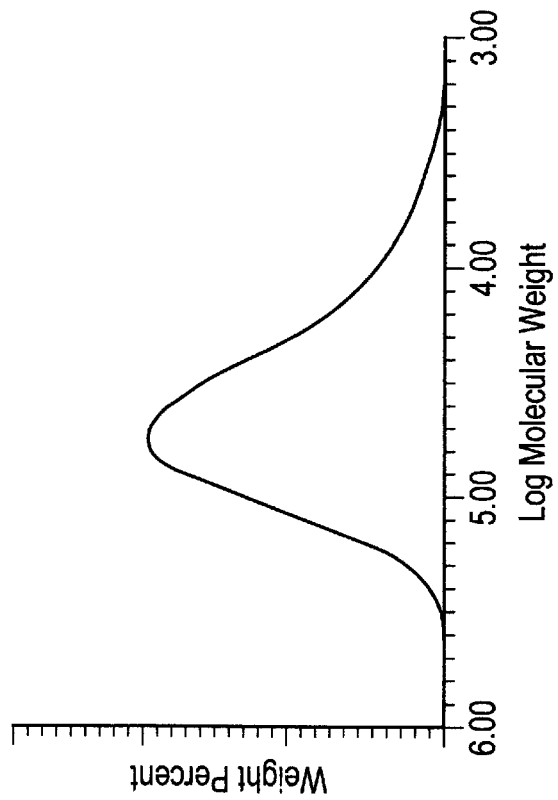

The presence of long chain branching in the polymers of this invention is also detected in the molecular weight data shown in Table II. The control samples in each set (made without any species having 'at least two Z-N polymerizable bonds') which are polymerized using so called single site catalysts known in the art, have a typical Flory-type molecular weight distribution. Characteristics of such a distribution include $M_w/M_n$ (i.e. ratio of weight average to number average molecular weight) ~2.0 and $M_z/M_w$ (i.e. ratio of Z-average to weight average molecular weight) ~1.5. The actual measured values in Table II, for the control samples, are observed to adhere generally with these characteristic features. For the remaining products in each set, the molecular weight ratios $M_w/M_n$ and $M_z/M_w$ are seen to increase, tracking the increasing feed levels of the species with 'at least two Z-N polymerizable bonds'. Observation of the GPC molecular weight distributions of products made with and without the species having 'at least two Z-N polymerizable bond;' (gee FIG. 2) shows clearly the formation of a high molecular weight tail, attributable directly to the presence of long chain branch-containing species.

The polymers of this invention show high levels of residual unsaturation, as shown by the data presented in Table II. The products with long chain branching in each set show substantially higher levels of total unsaturation versus the control. This unsaturation is available to be utilized, post-polymerization in crosslinking to yield a material behaving much like a thermosetting polymer, or in functionalization and for other purposes.

Figure 3:
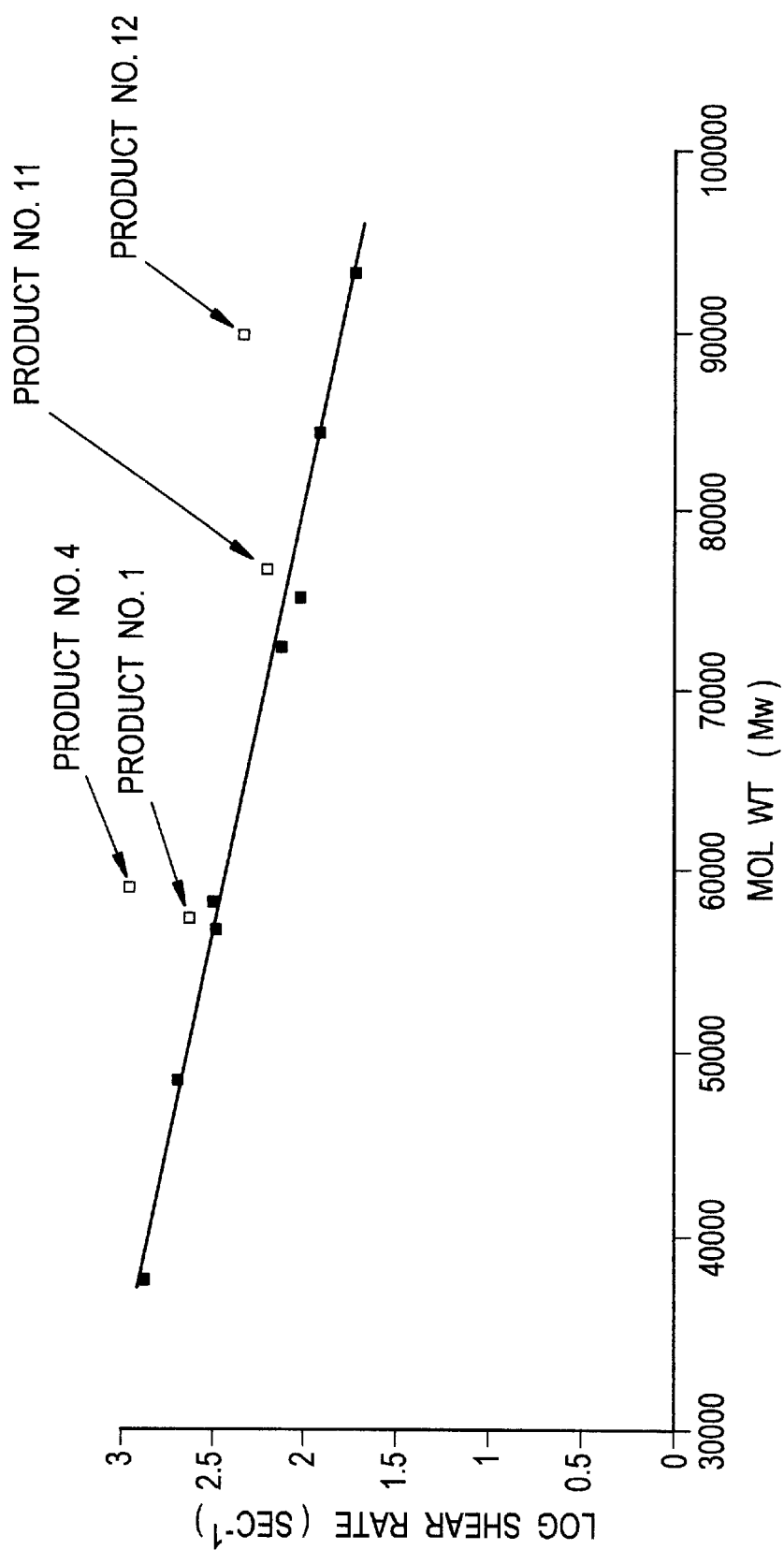
FIG. 3 is a plot of the shear rate, measured in reciprocal seconds ($s^{-1}$), at the onset of melt fracture versus weight average molecular weight ($M_w$) for the polymers of this invention and for typical linear ethylene/α-olefin polymers. These onset points, at the different molecular weights, are defined as the points of significant change in slope of shear stress as a function of shear rate, from capillary rheometry measurements. This is a well accepted procedure for identifying the onset of melt fracture. At the same molecular weight, $M_w$, a higher onset shear rate reflects an improvement in melt fracture response. The data was derived from capillary rheometry measurements conducted at 125° C.
Figure 4B:
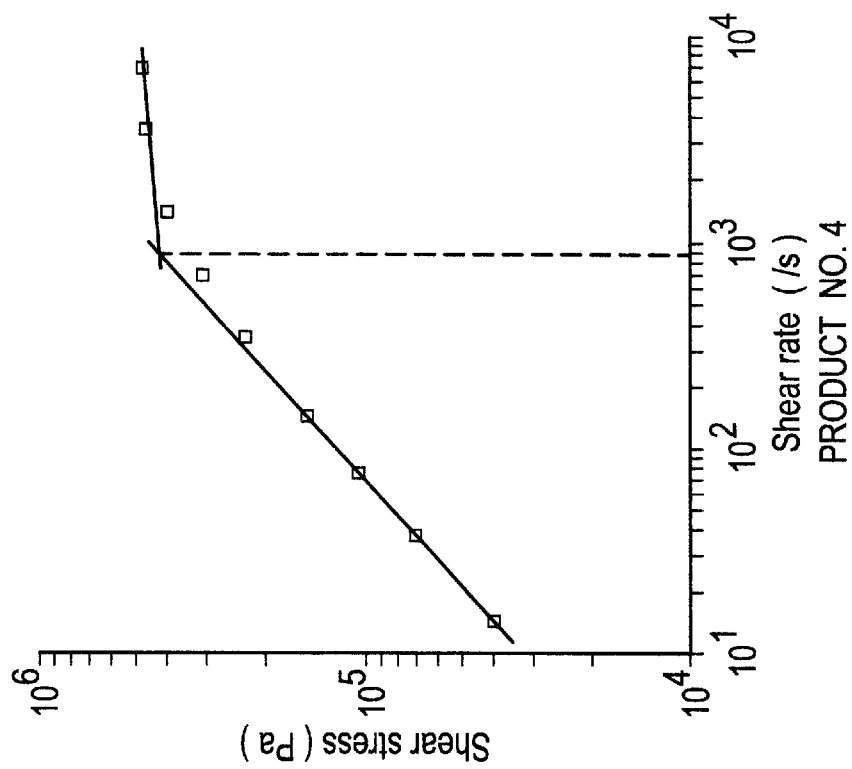
FIG. 4 shows the method of assessing melt fracture onset from plots of capillary rheometry derived shear stress ($P_a$) versus shear rate ($s^{-1}$) in the melt for a set of ethylene/α-olefin polymers made without (the control) and with (polymers of this invention) the species having at least two Z-N polymerizable bonds. The plots demonstrate the significant change in slope and the methodology for defining the point of melt fracture onset, referred to in FIG. 3. Note that for Product Number 1 (control) the melt fracture onset is a 407 $sec^{-1}$, while for Product No. 4 the melt fracture onset is at 867 $sec^{-1}$.
Figure 4A:
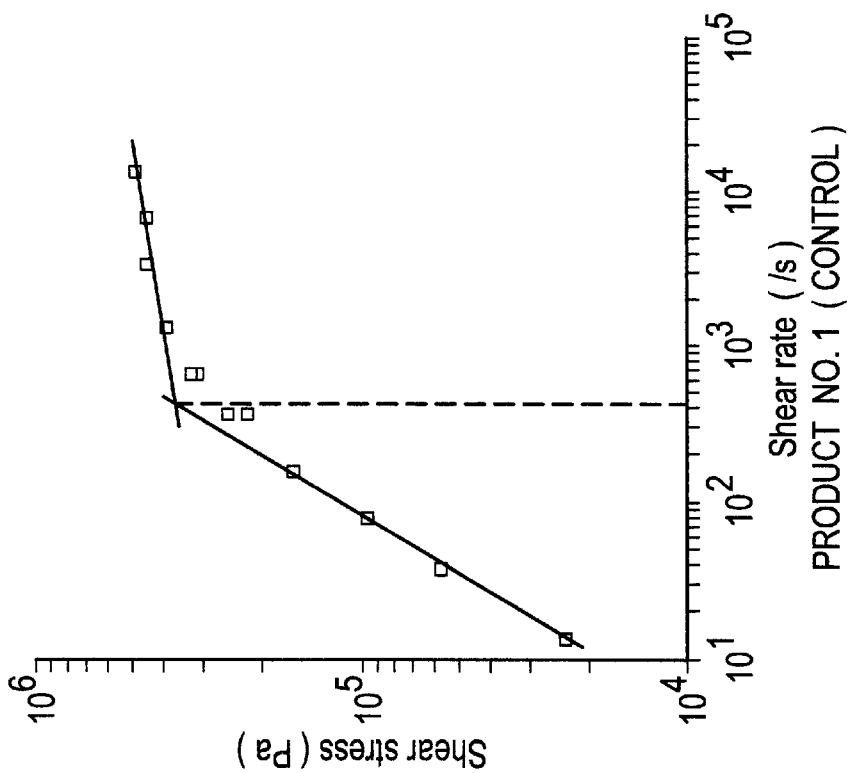

The long chain branch-containing polymers of this invention described in Table II, show an improvement in melt fracture response. A widely used technique to compare the melt fracture tendencies of related polymers is through observation of the shear rates at the onset of melt fracture, the onset point being defined as the point of significant change in slope of shear stress as a function of shear rate from capillary rheometry measurements at a given melt temperature (125° C.) (See FIG. 4). A higher onset shear rate reflects an improvement in melt fracture response. FIG. 3, which is a plot of onset shear rate versus molecular weight, $M_w$) shows the responses for the long chain branched polymers of this invention, Products 4 and 12, along with their respective controls Products 1 and 11 (characterization details in Table II). The line in FIG. 3 reflects the baseline performance of standard ethylene/α-olefin-based polymers derived from the single site catalysts defined in this set of experiments (EXACT™ products 3014, 3026, 3027, 4001, 4002, 4003, 4015, and 4040, covering the molecular weight range $M_w$ 38,000 to 94,000, available from Exxon Chemical Company, Houston, Tex.). The control samples, Product; 1 and 11, fall generally along the baseline, while the corresponding long chain branched polymers, Products 4 and 12, fall well above the baseline (higher onset shear rates), reflecting the improved melt fracture response.

Figure 5:
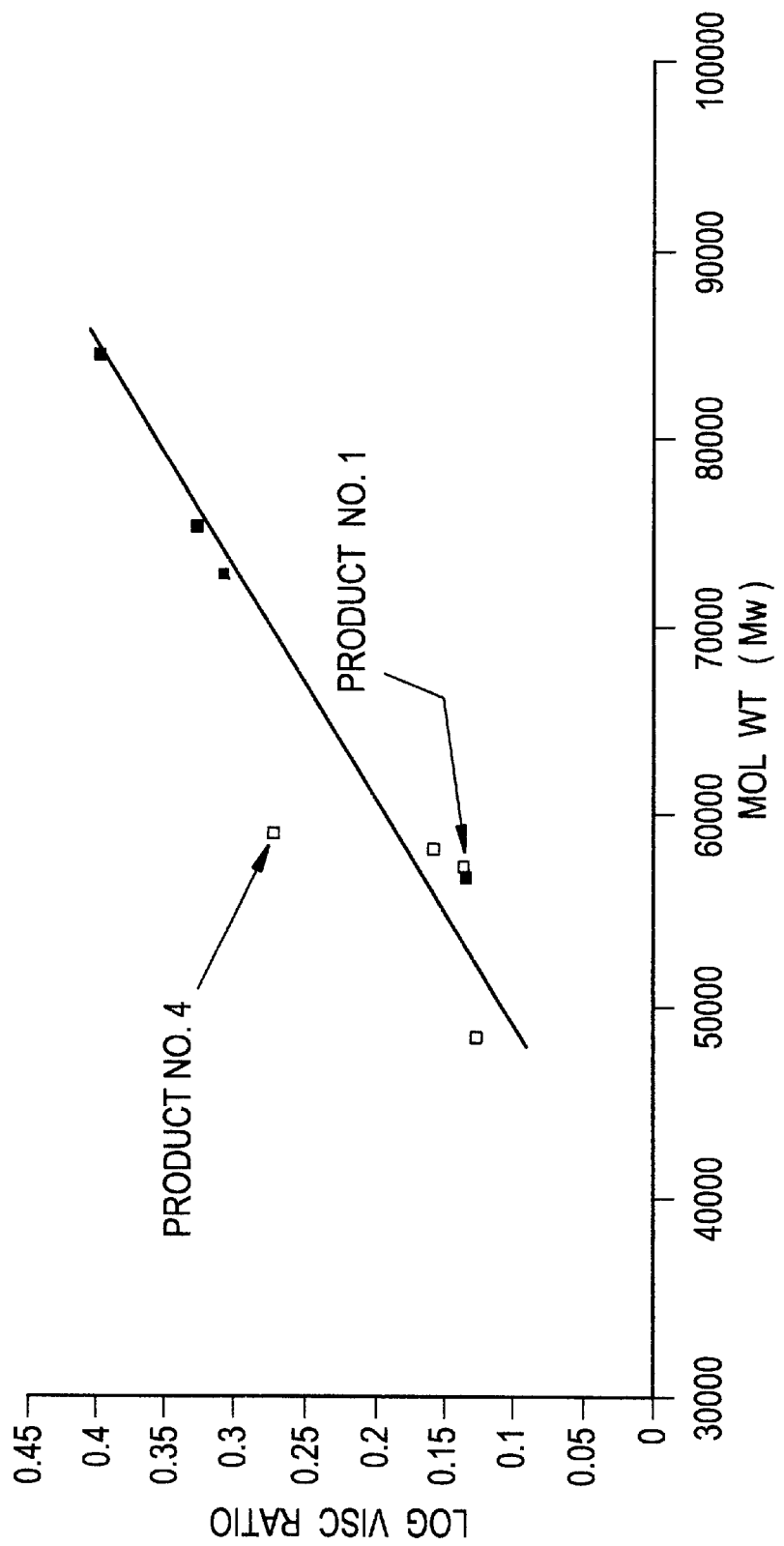
FIG. 5 is a plot of the ratio of viscosity at a shear rate of 14 $s^{-1}$ to the viscosity at a shear rate of 69 $s^{-1}$ versus molecular weight, $M_w$ for the polymers of this invention and for typical linear ethylene/α-olefin polymers. The line in FIG. 5 reflects the performance of standard ethylene/α-olefin based polymers derived from single-site catalysis (EXACT polymers obtainable from Exxon Chemical Company, Houston, Tex.) The viscosity/shear rate data were obtained from capillary rheometry. This ratio is an indicator of shear sensitivity behavior, a higher ratio value at any given $M_w$ corresponding to higher (i.e., improved for many applications) shear thinning behavior. In other words, the polymers of this invention become more fluid as shear stress increases.

The long chain branch-containing polymers of this invention described in Table II, show higher shear sensitivity in the melt. Shear sensitivity relates to the amount of viscosity reduction achieved at higher shear rates versus the viscosity at low shear rates, from capillary rheometry measurements at a given melt temperature. Comparing related polymers, a larger viscosity reduction signifies higher shear sensitivity and easier melt extrudability. FIG. 5 plots the ratio of viscosities at a shear rate of $14s^{-1}$ (low shear rate) and $69 \text{ s}^{-1}$ (high shear rate) versus molecular weight $M_w$. This ratio is used as an indicator of shear sensitivity behavior, a higher ratio value corresponding to higher shear thinning, which is desirable for many applications. The line in FIG. 5 reflects the baseline performance of standard ethylene/α-olefin-based polymers derived from the single site catalysts defined in this set of experiments. Control sample Product 1 is seen to fall with the baseline points, while Product 4, the long chain branched polymer of this invention falls well above the baseline, reflecting higher shear sensitivity.

Experiment Set V

Most of the polymerizations were conducted using the reaction system described in experiment gets I–IV. This system involves once-through polymerization of reactants, with no recycling of unreacted monomers back to the reaction system. In Set V, high pressure polymerizations were conducted in a larger (4 liter) adiabatic, stirred, autoclave reactor that operated generally like the previously described reactor, additionally equipped with a recycle system for passing unreacted ingredients past a cooler and compressor back to the autoclave reactor, together with fresh monomers for replacing the consumed amounts. The diene used in this experiment was norbornadiene (NBD).

Table III describes the polymerization and reaction conditions for experiment Set V.

Table IV provides a summary of some product parameters measured on the polymers produced. As described in the previous experiments, the polymer of this set of experiments (made using norbornadiene as the species with 'at least two Z-N polymerizable bonds') shows a difference in $E_a$, $\Delta E_a$, substantially>1 kcal/mol, reflecting the presence of long chain branch-containing species. The molecular weight distribution is also increased versus the characteristic Flory value of the control, another indication of long chain branching.

Those skilled in the art will appreciate that the foregoing description is exemplary of preferred embodiments of the present invention. The invention can assume other forms not necessarily within the scope of any express example or preferred embodiment recited above. The coverage of this patent is limited only as set forth in the appended claims.

TABLE I

SUMMARY OF CAT/POLYMERIZATION CONDITIONS ON 'ONCE-THROUGH' PILOT LINE

| Set | Product No. | Molar Product Composition | $C_n^=/C_2^=$ Molar Feed Ratio | $C_n^{==}/C_2^=$ Feed Ratio | Cat Type | MAO Cat Amount | MAO Cocat Concn | Cocat Vol | Total Solvent Type | Soln Cat Soln Volume | Cat Metal Flow Rate | Al/Trans Molar Ratio | Reactor Pressure | Reactor Temp | Melt Prod. Rate | Melt Index (g/10 min) |
|---|---|---|---|---|---|---|---|---|---|---|---|---|---|---|---|---|
| I | 1. | $C_2^=/C_4^=$ | 1.2 | 0 | A | 2.03 g | 10 wt % | 2 L | Toluene | 10 L | 0.16 L/hr | 675 | 1300 bar | 185 C. | 2.4 kg/hr | 15.2 |
|   | 2. | $C_2^=/C_4^=/1,5HD$ | 1.2 | 0.2 | A | 2.03 g | 10 wt % | 2 L | Toluene | 10 L | 0.4 L/hr | 675 | 1300 bar | 185 C. | 3.0 kg/hr | 27.4 |
|   | 3. | $C_2^=/C_4^=/1,5HD$ | 0.8 | 0.6 | A | 2.03 g | 10 wt % | 2 L | Toluene | 10 L | 0.7 L/hr | 675 | 1300 bar | 185 C. | 2.7 kg/hr | 31.7 |
|   | 4. | $C_2^=/C_4^=/1,5HD$ | 0.6 | 1.2 | A | 2.03 g | 10 wt % | 2 L | Toluene | 10 L | 0.7 L/hr | 675 | 1300 bar | 175 C. | 3.1 kg/hr | 6.3 |
| II | 5. | $C_2^=/C_4^=$ | 1.25 | 0 | A | 1.00 g | 30 wt % | 0.33 L | Toluene | 20 L | 0.35 L/hr | 678 | 1300 bar | 170 C. | 3.4 kg/hr | 4.1 |
|   | 6. | $C_2^=/C_4^=/1,9DD$ | 1.25 | 0.04 | A | 1.00 g | 30 wt % | 0.33 L | Toluene | 20 L | 0.44 L/hr | 678 | 1300 bar | 170 C. | 4.0 kg/hr | 2.0 |
|   | 7. | $C_2^=/C_4^=/1,9DD$ | 1.25 | 0.20 | A | 1.00 g | 30 wt % | 0.33 L | Toluene | 20 L | 0.39 L/hr | 678 | 1300 bar | 170 C. | 4.2 kg/hr | 0.5 |
| III | 8. | $C_2^=/C_6^=$ | 0.3 | 0 | B | 1.54 g | 30 wt % | 1 L | Toluene | 20 L | 0.76 L/hr | 1397 | 1300 bar | 180 C. | 3.7 kg/hr | 7.1 |
|   | 9. | $C_2^=/C_6^=/VNB$ | 0.3 | 0.01 | B | 1.54 g | 30 wt % | 1 L | Toluene | 20 L | 1.0 L/hr | 1397 | 1300 bar | 180 C. | 3.0 kg/hr | 4.5 |
|   | 10. | $C_2^=/C_6^=/VNB$ | 0.3 | 0.03 | B | 1.54 g | 30 wt % | 1 L | Toluene | 20 L | 1.55 L/hr | 1397 | 1300 bar | 180 C. | 4.8 kg/hr | 1.1 |
| IV | 11. | $C_2^=/C_6^=$ | 0.95 | 0 | A | 1.0 g | 30 wt % | 0.33 L | Toulene | 20 L | 0.57 L/hr | 680 | 1600 bar | 170 C. | 3.8 kg/hr | 3.4 |
|   | 12. | $C_2^=/C_6^=/VNB$ | 0.95 | 0.05 | A | 1.0 g | 30 wt % | 0.33 L | Toulene | 20 L | 0.63 L/hr | 680 | 1600 bar | 140 C. | 2.4 kg/hr | 2.1 |

NOTES:
$C_n^=$ = refers to the alpha olefin (mono-olefin)
$C_n^{==}$ refers to species with 'at least two Z-N polymerizable bonds' (Includes dienes, trienes; cyclic or non-cyclic monomers)
Catalyst type A ia $Me_2Si(H_4\text{-}INDENYL)_2 ZrCl_2$
Catalyst type B is $Me_2Si(Me_4C_5)(N\text{-}c\text{-}C_{12}H_{23}) TiCl_2$

TABLE II

SUMMARY OF PROPERTY DATA ON POLYMER SETS MADE ON ONCE-THROUGH PILOT LINE

| Set | Product No | Product Composition | $C_n^=/C_2^=$ Molar Feed Ratio | α-Olefin Incorporation in Polymer | Melt Index (g/10 min) | Melt Index Ratio | $M_n$ | $M_w$ | $M_z$ | $M_w/M_n$ | $M_z/M_w$ | Measured Flow Activation Energy ($E_A$ in kcal/mol) | $\Delta E_a$ | Vinyl | Vinylene | Vinylidene |
|---|---|---|---|---|---|---|---|---|---|---|---|---|---|---|---|---|
| I | 1. | $C_2^=/C_4^=$ | 0 | 13.1 wt % $C_4^=$ | 15.2 | 19.4 | 28235 | 57600 | 90655 | 2.04 | 1.58 | 7.1 | 0 | .257 | .354 | .258 |
|  | 2. | $C_2^=/C_4^=/1,5HD$ | 0.2 | 15.1 wt % $C_4^=$ | 27.4 | 21.1 | 24280 | 50500 | 79960 | 2.08 | 1.59 | 7.3 | 0 | 1.317 | .516 | .354 |
|  | 3. | $C_2^=/C_4^=/1,5HD$ | 0.6 | 7.1 wt % $C_4^=$ | 31.7 | 18.6 | 19255 | 43900 | 76195 | 2.28 | 1.74 | 8.4 | 1.4 | 3.824 | .405 | .278 |
|  | 4. | $C_2^=/C_4^=/1,5HD$ | 1.2 | 6.9 wt % $C_4^=$ | 6.3 | 33.1 | 25630 | 59200 | 116400 | 2.31 | 1.97 | 9.6 | 2.6 | 6.646 | .696 | .239 |
| II | 5. | $C_2^=/C_4^=$ | 0 | 12.0 wt % $C_4^=$ | 4.1 | 17.5 | 30360 | 71730 | 126390 | 2.36 | 1.76 | 7.9 | 0.6 |  |  |  |
|  | 6. | $C_2^=/C_4^=/1,9DD$ | 0.04 | 10.6 wt % $C_4^=$ | 2.0 |  | 31970 | 89790 | 229890 | 2.81 | 2.56 | 8.4 | 1.2 |  |  |  |
|  | 7. | $C_2^=/C_4^=/1,9DD$ | 0.20 | 12.3 wt % $C_4^=$ | 0.5 | 56.0 | 26350 | 111300 | 383850 | 4.22 | 3.45 | 10.7 | 3.4 |  |  |  |
| III | 8. | $C_2^=/C_6^=$ | 0 | 17.4 wt % $C_6^=$ | 7.1 | 24.4 | 21700 | 60660 | 106560 | 2.80 | 1.76 | 8.8 | 0.8 |  |  |  |
|  | 9. | $C_2^=/C_6^=/VNB$ | 0.01 | 17.7 wt % $C_6^=$ | 4.5 | 31.0 | 22600 | 67430 | 147820 | 2.98 | 2.19 | 9.3 | 1.3 |  |  |  |
|  | 10. | $C_2^=/C_6^=/VNB$ | 0.03 | 18.4 wt % $C_6^=$ | 1.1 | 41.7 | 26570 | 81220 | 231490 | 3.06 | 2.85 | 10.1 | 2.0 |  |  |  |
| IV | 11. | $C_2^=/C_6^=$ | 0 | 13.2 wt % $C_6^=$ | 3.4 | 15.8 | 42430 | 76860 | 115230 | 1.81 | 1.50 | 8.2 | 0.5 | 0.1 | 0.3 | 0.0 |
|  | 12. | $C_2^=/C_6^=/VNB$ | 0.05 | 13.2 wt % $C_6^=$ | 2.1 | 19.7 | 44280 | 89965 | 235650 | 2.03 | 2.62 | 9.3 | 1.6 | 4.8 | 0.6 | 0.0 |

TABLE III

SUMMARY OF CAT/POLYMERIZATION CONDITIONS ON PILOT LINE WITH RECYCLE SYSTEM

| Set | Product No. | Product Composition | Cat Type | Cat Concn | MAO Cocat Concn | Solvent Type | Al/Transition Metal Molar Ratio | $C_4^-/C_2^-$ Wt. Ratio in Fresh Feed | $NBD/C_2^-$ Wt. Ratio | Reactor Pressure | Reactor Temperature Top/Bottom | Melt Index (g/10 min) |
|---|---|---|---|---|---|---|---|---|---|---|---|---|
| V | 13. | $C_2^-/C_4^-$ | A | 0.8 g/L | 5 wt % | Toluene | 400 | 2.9 | — | 1600 bar | 140 C./158 C. | 3.3 |
|   | 14. | $C_2^-/C_4^-$/NBD | A | 0.8 g/L | 5 wt % | Toluene | 400 | 2.6 | $7.7 \times 10^{-3}$ | 1300 bar | 153 C./180 C. | 3.6 |

TABLE IV

SUMMARY OF PROPERTY DATA ON POLYMER SET V MADE ON PILOT LINE WITH RECYCLE SYSTEM

| Set | Product No. | Product Composition | $NBD/C_2^-$ | Alpha Olefin Incorporation in Polymer | Melt Index (g/10 Min) | Melt Index Ratio | $M_n$ | $M_w$ | $M_w/M_n$ | Flow Activation Energy ($E_A$ in kcal/Mol) | $\Delta E_a$ |
|---|---|---|---|---|---|---|---|---|---|---|---|
| V | 13. | $C_2^-/C_4^-$ | — | 13 wt % $C_4^=$ | 3.3 | 15.5 | 34,560 | 69,470 | 2.0 | 7.9 | 0.6 |
|   | 14. | $C_2^-/C_4^-$/NBD | $7.7 \times 10^{-3}$ | 15 wt % $C_4^=$ | 3.6 | 27.5 | 26,100 | 60,820 | 2.3 | 11.8 | 4.3 |

We claim:

1. Copolymer derived from polymerizing at least three monomers in the presence of metallocene catalyst, the three monomers comprising:
   a) one mono-olefin having a single Ziegler-Natta polymerizable bond;
   b) a second monomer having at least one Ziegler-Natta polymerizable bond;
   c) a third monomer having at least two Ziegler-Natta polymerizable bonds such monomer being:
      i) straight-chained of less than six or at least seven carbon atoms;
      ii) other than straight chained; or
      iii) combinations thereof,
   such copolymer having:
   d) at least about one carbon-carbon unsaturated bond per number average molecule;
   e) viscous energy of activation ($E_a$) at least 1 kcal/mol greater than a copolymer having a linear backbone derived from same monomers, but excluding species having at least two Ziegler-Natta polymerizable bonds;
   f) crystallinity level in the range of about 10% to about 50%;
   g) $M_z/M_w$ at least about 1.7 to about 3.45; and
   h) long chain branching from a first Ziegler-Natta polymerizable bond of a third monomer being incorporated in a first polymer chain and a second Ziegler-Natta polymerizable bond in that third monomer being incorporated in a second polymer chain.

2. Copolymer of claim 1 wherein said one mono-olefin having a single Ziegler-Natta polymerizable bond is ethylene.

3. Copolymer of claim 2 wherein said third monomer is a diene.

4. Copolymer of claim 3 wherein said diene is selected from the group consisting of: 1,3-butadiene, 1,4-pentadiene, 1,6-heptadiene, 1,7-octadiene, 1,8-nonadiene, 1,9-decadiene, 1,10-undecadiene, 1,11-dodecadiene, cyclohexadiene, cyclooctadiene, norbornadiene, and vinyl norbornene.

5. Copolymer of claim 3 wherein said second monomer having at least one Ziegler-Natta polymerizable bond is selected from the group consisting of: propylene, butene-1, pentene-1, hexene-1, heptene-1, octene-1, nonene-1, decene-1, undecene-1, dodecene-1, hexadecene-1, octadecene-1, and 4-methylpentene-1.

6. Copolymer derived from at least three monomers comprising:
   a) a first monomer comprising ethylene;
   b) a second monomer selected from the group consisting of butene-1, hexene-1, octene-1, decene-1, dodecene-1, octadecene-1, and 4-methylpentene-1; and
   c) a third monomer selected from the group consisting of 1,3-butadiene, 1,4-pentadiene, 1,6-heptadiene, 1,7-octadiene, 1,8-nonadiene, 1,9-decadiene, 1,10-undecadiene, 1,11-dodecadiene, norbornadiene, vinyl norbornene, cyclohexadiene, cyclooctadiene, cyclodecadiene, and branched non-cyclic diene,
   such copolymer having:
   d) at least about one carbon-carbon unsaturated bond per number average molecule;
   e) viscous energy of activation ($E_a$) at least 1 kcal/mol greater than a copolymer having a linear backbone derived from same monomers, but excluding species having at least two Ziegler-Natta polymerizable bonds;
   f) crystallinity level in the range of about 10% to about 50%; and
   g) $M_z/M_w$ at least about 1.7 to about 3.45.

7. Process for copolymerizing:
   a) one mono-olefin having a single Ziegler-Natta polymerizable bond;
   b) a second monomer having at least one Ziegler-Natta polymerizable bond;
   c) a third monomer having at least two Ziegler-Natta polymerizable bonds such monomer being:
      i) straight-chained of less than six or at least seven carbon atoms;
      ii) other than straight chained; or
      iii) combinations thereof, wherein a first Ziegler-Natta polymerizable bond of a third monomer is incorporated in a first polymer chain, and a second Ziegler-Natta polymerizable bond in that third monomer is incorporated in a second polymer chain to form a long chain branch, such process comprising the steps of:
  d) contacting said monomers with a metallocene catalyst at a pressure in excess of about 100 bar and a temperature greater than about 100.C; and
  e) recovering a copolymer, wherein the copolymer has:
    i) at least about one carbon-carbon unsaturated bond per number average molecule;
    ii) viscous energy of activation ($E_a$) at least 1 kcal/mol greater than a copolymer having a linear backbone derived from the same monomers, but excluding species having at least two Ziegler-Natta polymerizable bonds;
    iii) crystallinity level in the range of about 10% to about 50%; and
    iv) $M_z/M_w$ at least about 1.7 to about 3.45.

8. Process for copolymerizing;
  a) one mono-olefin having a single Ziegler-Natta polymerizable bond;
  b) a second monomer having at least one Ziegler-Natta polymerizable bond;
  c) a third monomer having at least two Ziegler-Natta polymerizable bonds such monomer being:
    i) straight-chained of less than six or at least seven carbon atoms;
    ii) other than straight chained; or
    iii) combinations thereof, wherein
      said one mono-olefin is selected from the group consisting of ethylene and propylene;
      said second monomer is selected from the group consisting of: butene-1, pentene-1, hexene-1, heptene-1, octene-1, nonene-1, decene-1, undecene-1, dodecene-1, hexadecene-1, octadecene-1 4-methylpentene-1; and
      said third monomer having at least two Ziegler-Natta polymerizable bonds is selected from the group consisting of: 1,3-butadiene, 1,4-pentadiene, 1,6-heptadiene, 1,7-octadiene, 1,8-nonadiene, 1,9-decadiene, 1,10-undecadiene, 1,11-dodecadiene, norbornadiene, vinyl norbornene, cyclohexadiene, cyclooctadiene, cyclodecadiene and branched, non-cyclic dienes, such process comprising the steps of:
  d) contacting said monomers with a Ziegler-Natta catalyst at a pressure in excess of about 100 bar and a temperature greater than about 60° C.; and
  e) recovering a copolymer, wherein the copolymer has:
    i) at least about one carbon-carbon unsaturated bond per number average molecule;
    ii) viscous energy of activation ($E_a$) at least 1 kcal/mol greater than a copolymer having a linear backbone derived from the same monomers, but excluding species having at least two Ziegler-Natta polymerizable bonds;
    iii) crystallinity level in the range of about 10% to about 50%; and
    iv) $M_z/M_w$ at least about 1.7 to about 3.45.

9. Process of claim 8 wherein said monomer having at least two Ziegler polymerizable bonds is selected from the group consisting of: 1,7-octadiene 19-decadiene, 1,11-dodecadiene, norbornadiene, vinyl norbornene, cyclohexadiene, and cyclodecadiene.

10. Process of claim 9 wherein said second monomer is selected from the group consisting of: butene-1, pentene-1, hexene-1, octene-1, decene-1, dodecene-1, octadecene-1, and 4-methylpentene-1.

11. Process of claim 7 wherein said copolymer has in the range of about 1 to about 8 unsaturated carbon-carbon bonds per number average molecular weight.

12. Process of claim 7 wherein said copolymer has in the range of about 2 to about 8 unsaturated carbon-carbon bonds per number average molecular weight.

13. Process of claim 7 wherein an activator comprising alumoxane, bulky labile anionic species, or combinations thereof is used as an activator for the metallocene catalyst system.

14. Process of claim 13 wherein an activator and scavenger combinations are used with the metallocene catalyst system.

15. The process according to claim 11, where in the Ziegler-Natta catalyst comprises a single-site Ziegler-Natta catalyst.

16. A process comprising polymerizing ethylene and a polyene having at least two Ziegler polymerizable double bonds at a temperature of at least 120° C. using a single-site Ziegler-Natta catalyst to make an ethylene copolymer having an MIR of at least 25 and an activation energy of at least 9.0 kcal per mol.

17. Process for copolymerizing:
  a) one mono-olefin having a single Ziegler-Natta polymerizable bond;
  b) a second monomer having at least one Ziegler-Natta polymerizable bond;
  c) a third monomer having at least two Ziegler-Natta polymerizable bonds such monomer being:
    i) straight-chained of less than six or at least seven carbon atoms;
    ii) other than straight chained; or
    iii) combinations thereof, wherein
      said one mono-olefin is selected from the group consisting of ethylene and propylene;
      said second monomer is selected from the group consisting of: butene-1, pentene-1, hexene-1, octene-1, decene-1, dodecene-1, octadecene-1, 4-methylpentene-1; and
      said third monomer having at least two Ziegler-Natta polymerizable bonds is selected from the group consisting of: 1,7-octadiene, 1,9-decadiene, norbornadiene, and vinyl norbornene, such process comprising the steps of:
  d) contacting said monomers with a Ziegler-Natta catalyst at a pressure in excess of about 100 bar and a temperature greater than about 60° C.; and
  e) recovering a copolymer.

18. The process according to claim 17, wherein the Ziegler-Natta catalyst comprises a single-site Ziegler-Natta catalyst.

19. The copolymer of claim 1 wherein the copolymer has at least about 5.4 carbon-carbon unsaturated bonds per 1000 carbons.

20. The process of claim 7 wherein said copolymer has at least about 5.4 carbon-carbon unsaturated bonds per 1000 carbons.

21. The process of claim 8 wherein said copolymer has at least about 5.4 carbon-carbon unsaturated bonds per 1000 carbons.

22. The copolymer of claim 6 wherein the copolymer has at least about 5.4 carbon-carbon unsaturated bonds per 1000 carbons.

23. The process of claim 17 wherein said copolymer has at least about 5.4 carbon-carbon unsaturated bonds per 1000 carbons.

24. The copolymer of claim 1 wherein $M_z/M_w$ is at least about 1.97 to about 3.45.

25. The copolymer of claim 6 wherein $M_z/M_w$ is at least about 1.97 to about 3.45.

26. The copolymer of claim 19 wherein $M_z/M_w$ is at least about 1197 to about 3.45.

27. The copolymer of claim 22 wherein $M_z/M_w$ is at least about 1.97 to about 3.45.

* * * * *